United States Patent [19]
Schmiesing et al.

[11] Patent Number: 6,105,428
[45] Date of Patent: Aug. 22, 2000

[54] SENSOR AND METHOD OF USE

[75] Inventors: John E. Schmiesing, Tempe; Guang X. Li, Gilbert; Juergen A. Foerstner, Mesa; Muh-Ling Ger; Paul L. Bergstrom, both of Chandler; Frank A. Shemansky, Jr., Phoenix, all of Ariz.

[73] Assignee: Motorola, Inc., Schaumburg, Ill.

[21] Appl. No.: 09/209,116

[22] Filed: Dec. 10, 1998

[51] Int. Cl.[7] .................................................. G01P 15/125
[52] U.S. Cl. ..................................... 73/514.32; 361/283.3
[58] Field of Search ........................... 73/514.32, 514.36, 73/514.38, 514.21, 514.24; 361/280, 283.1, 283.3

[56] References Cited

U.S. PATENT DOCUMENTS

| 4,882,933 | 11/1989 | Petersen et. al. | 53/517 R |
| 5,181,156 | 1/1993 | Gutteridge et al. | 361/283 |
| 5,495,761 | 3/1996 | Diem et al. | 73/514.32 |
| 5,542,295 | 8/1996 | Howe et al. | 73/514.18 |
| 5,574,222 | 11/1996 | Offenberg | 73/514.32 |
| 5,578,755 | 11/1996 | Offenberg | 73/514.32 |
| 5,662,771 | 9/1997 | Stouppe | 438/25.41 |
| 5,679,436 | 10/1997 | Zhao | 73/514.32 |
| 5,817,942 | 10/1998 | Greiff | 73/514.01 |

FOREIGN PATENT DOCUMENTS 6-347474  12/1994  Japan .

OTHER PUBLICATIONS

S.C. Chang et al., "Resonant–bridge Two–axis Microaccelerometer" Sensors and Actuators, A21–A23 (1190), pp. 342–345.

*Primary Examiner*—Helen C. Kwok
*Attorney, Agent, or Firm*—A. Kate Huffman

[57] ABSTRACT

A sensor has an electrode (120) that is movable along three mutually perpendicular axes (10, 11, 12). The sensor also has stationary over-travel limiting structures that restrict the movement of the electrode (120) along the three axes (10, 11, 12).

1 Claim, 3 Drawing Sheets

SENSOR AND METHOD OF USE

BACKGROUND OF THE INVENTION

This invention relates, in general, to electronics, and more particularly, to sensors and methods of use.

Micromachined sensors can detect acceleration by measuring a change in capacitance. Many sensors are in-plane sensors that detect acceleration along an axis parallel to the surface of a support substrate. These in-plane sensors have an electrode that overlies the surface of the support substrate where the electrode moves along the axis in response to an acceleration along that same axis. The electrode moves between two stationary electrodes, and the differential capacitance between the two stationary electrodes and the movable electrode determines the magnitude of acceleration.

However, these in-plane sensors are also mobile along an orthogonal axis that is perpendicular to the surface of the underlying support substrate. A large acceleration force along the orthogonal axis could move the movable electrode on top of one of the two stationary electrodes, and the movable electrode could remain immobilized in that position. This immobilization makes the sensor inoperable.

Additionally, the in-plane sensors also have stiction problems that affect the manufacturing yields of the sensor and that also affect the reliability of the sensor. During manufacturing, stiction may prevent the movable electrode from becoming mobile. During use, stiction may convert a previously movable electrode into an immobile electrode. Both of these results render the sensor inoperable.

Accordingly, a need exists for an improved sensor and method of use that improves the manufacturing yields of the sensor and the reliability of the sensor.

BRIEF DESCRIPTION OF THE DRAWINGS

For simplicity and clarity of illustration, elements in the drawings are not necessarily drawn to scale, and the same reference numerals in different figures denote the same elements.

DETAILED DESCRIPTION OF THE DRAWINGS

Figure 1:
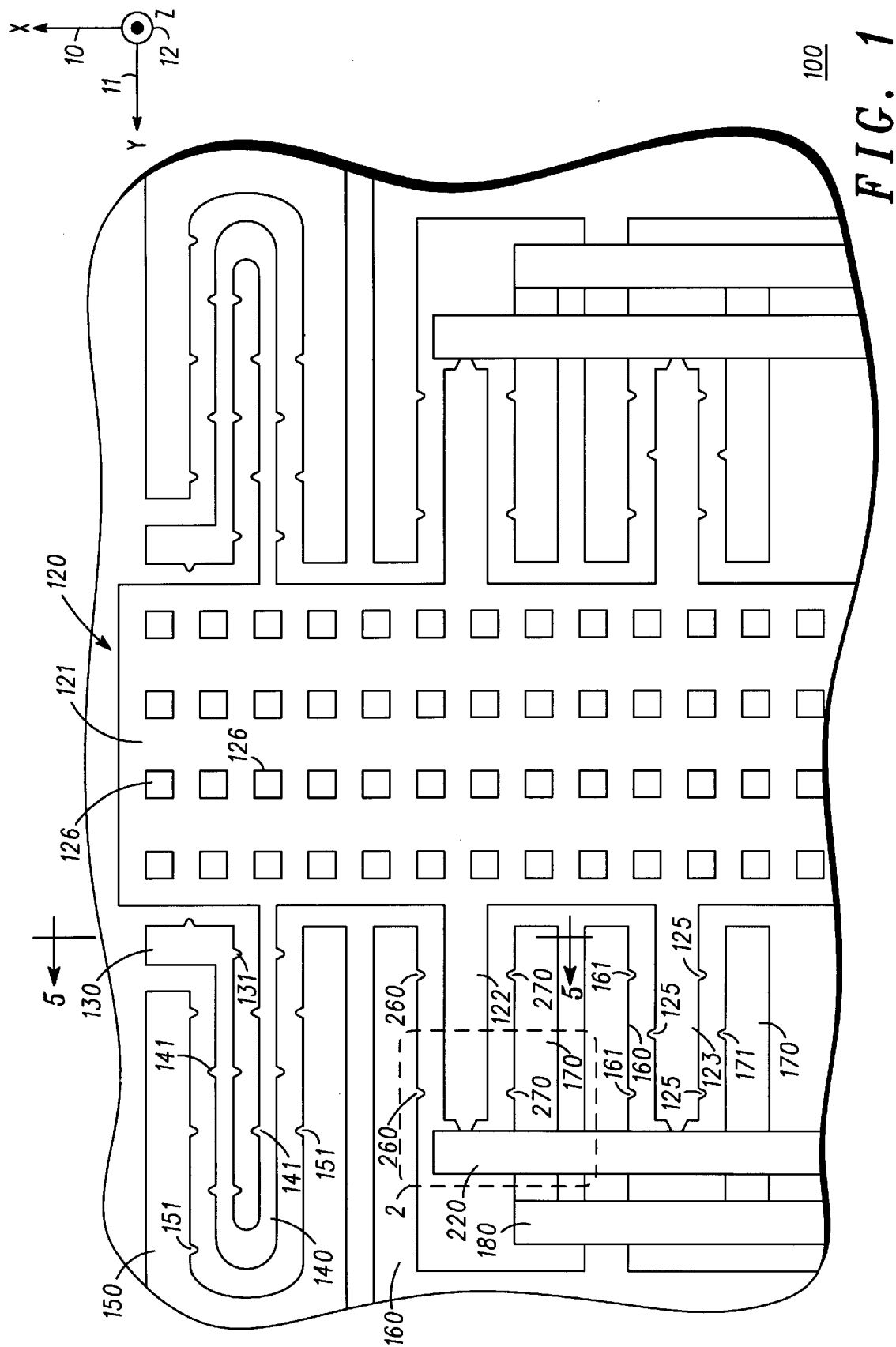
FIG. 1 illustrates an embodiment of a top view of a portion of a sensor in accordance with the present invention.

FIG. 1 illustrates a top view of a portion of a sensor 100. Sensor 100 is an in-plane accelerometer that detects acceleration along an x-axis 10. X-axis 10 is perpendicular to a y-axis 11 and a z-axis 12, and y-axis 11 is perpendicular to z-axis 12. In other words, x, y, and z-axes 10, 11, and 12, respectively, are mutually orthogonal. X, y, and z-axes 10, 11, and 12, respectively, define a right-handed Cartesian coordinate system. Therefore, in FIG. 1, z-axis 12 points out of the page.

Sensor 100 includes, among other features, a movable electrode 120, a first set of fixed or stationary electrodes 160, and a second set of fixed or stationary electrodes 170. As illustrated in FIG. 1, stationary electrodes 160 are interdigitated between stationary electrodes 170. Also illustrated in FIG. 1, stationary electrodes 160 are electrically shorted together to be biased at the same potential, and stationary electrodes 170 are electrically shorted together to be biased at a different potential. Electrodes 160 and 170 are not electrically shorted together.

Movable electrode 120 has several components including a central body 121 and outer perimeter fingers 122 and 123 that are parallel to each other and that extend substantially perpendicularly away from the side of central body 121. As illustrated in FIG. 1, fingers 122 and 123 are located or interdigitated between stationary electrodes 160 and 170. In particular, finger 122 is located between a first one of stationary electrodes 160 and a first one of stationary electrodes 170, and finger 123 is located between a second one of stationary electrodes 160 and a second one of stationary electrodes 170.

Sensor 100 also includes anchors 130 and folded or bent suspension arms or beams 140. Anchors 130 overlie and are coupled to a surface of an underlying support substrate. Beams 140 couple or connect anchors 130 to body 121 of electrode 120. Anchors 130 and beams 140 suspend or support electrode 120 above the underlying support substrate. Anchors 130 and beams 140 permit electrode 120 to move independently of the support substrate. In particular, electrode 120 is movable along all of x, y, and z-axes 10, 11, and 12, respectively. X axis 10 and y-axis 11 are both substantially parallel to a surface of the underlying substrate, and z-axis 12 is substantially perpendicular or orthogonal to the surface of the underlying substrate.

In operation, stationary electrodes 160 and 170 are electrically biased to two different potentials, and anchors 130, beams 140, body 121, and fingers 122 and 123 are electrically biased to a third potential between the two different potential. For example, electrodes 160 can be biased to a first potential greater than the third potential while electrodes 170 are biased to a second potential less than the third potential, or vice versa.

A first capacitance is measured between finger 122 and the immediately adjacent one of stationary electrodes 160, and a second capacitance is measured between finger 122 and the immediately adjacent one of stationary electrodes 170. These two capacitances form a differential capacitance. Similarly, a capacitance is measured between finger 123 and the closest one of stationary electrodes 160, and another capacitance is measured between finger 123 and the closest one of stationary electrodes 170. These two capacitances form another different capacitance. When sensor 100 is at rest and is not subject to any acceleration forces, the differential capacitances measured with fingers 122 and 123 is a steady-state or nominal differential capacitance, which can be zero.

An acceleration along x-axis 10 moves electrode 120 along x-axis 10. The acceleration moves all of electrode 120 such that fingers 122 and 123 move closer to one of their respective stationary electrodes 160 or 170. The rigidity of electrode 120 requires both fingers 122 and 123 to simultaneously move in the same direction toward their respective electrode 160 or toward their respective electrode 170. In response to a larger acceleration force, fingers 122 and 123 move a greater distance to be closer to one of their respective stationary electrodes 160 or 170. This larger acceleration force produces a greater change in the differential capacitance.

Figure 2:
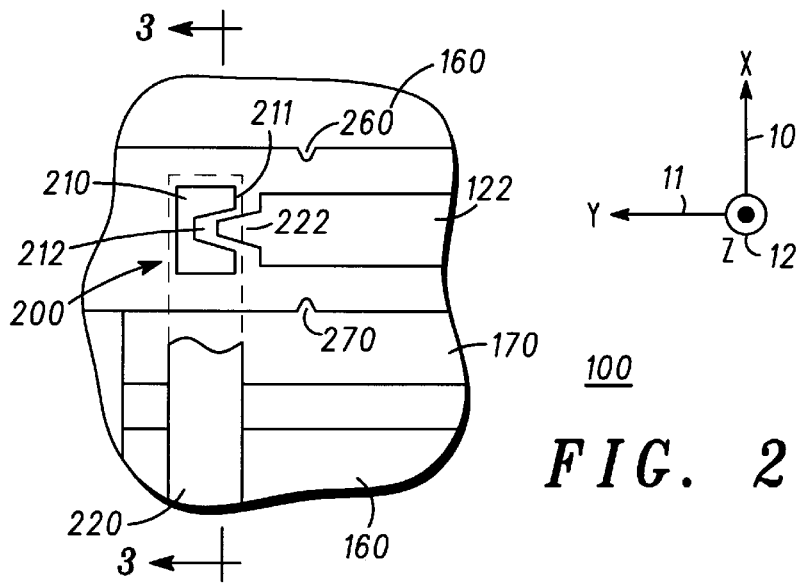
FIG. 2 illustrates an embodiment of a cut-away top view of a portion of the sensor.

FIG. 2 illustrates a cut-away top view of a portion of sensor 100 illustrated in FIG. 1. The portion of sensor 100 that is illustrated in FIG. 2 is identified by dashed rectangle 2 in FIG. 1. FIG. 2 illustrates a stationary structure 200 that limits or restricts the motion or mobility of a distal end of finger 122, and thus electrode 120 (FIG. 1), along each of x, y, and z-axes 10, 11, and 12, respectively. Structure 200 is also referred to as an over-travel limiter or motion stop because structure 200 prevents electrode 120 from moving too far in a direction along the three orthogonal axes.

Structure 200 includes a first portion or body 210 and a second portion or flap 220. Body 210 is located adjacent to or at a periphery of electrode 120 (FIG. 1). In particular, body 210 is located at a distal end of finger 122. Body 210 is also located between the same stationary electrodes 160 and 170 as finger 122. Body 210 has a side surface 211 and a recess 212 in surface 211. A distal end, tip, protrusion, nub, spike, bump, or portion 222 of finger 122 is located within recess 212. Portion 222 of finger 122 preferably extends away from body 121 of electrode 120 (FIG. 1) and toward body 210 of structure 200. This configuration of finger 122 and body 210 limits the mobility of electrode 120 (FIG. 1). In particular, portion 222 of finger 122 and recess 212 limits the over-travel of finger 122 along x-axis 10 and y-axis 11, which also limits the over-travel of electrode 120 along the same two axes because finger 122 is preferably a substantially rigid extension from body 121 (FIG. 1).

Sensor 100 also includes other features to further restrict the over-travel of electrode 120 along y-axis 11. For example, the folded or bent configuration of beam 140 illustrated in FIG. 1 limits the motion of electrode 120 along y-axis 11.

Sensor 100 additionally includes other features to further restrict the over-travel of electrode 120 along x-axis 10. For example, nubs, bumps, spikes, or protrusions 260 and 270 in FIGS. 1 and 2 extend from the surfaces of stationary electrodes 160 and 170, respectively, toward finger 122 to limit the mobility of finger 122 along x-axis 10. Additionally, in FIG. 1, a guard structure 150 surrounds a portion of beam 140 to limit the mobility of beam 140, which restricts the motion of electrode 120, and protrusions 151 extend from the surface of structure 150 to serve the same purpose. Furthermore, nubs, bumps, spikes, or protrusions 131 extend from anchor 130 in FIG. 1 and nubs, bumps, spikes, or protrusions 141 extend from the surface of beam 140 in FIG. 1 to perform similar over-travel limiting functions. The surfaces from which the aforementioned protrusions extend are preferably substantially perpendicular to z-axis 12.

Flap 220 of structure 200 in FIG. 2 is illustrated in a cut-away view to permit illustration of the details of body 210 and finger 122 that underlie flap 220. The cut-away portion of flap 220 is illustrated in phantom by dashed lines. Flap 220 covers or overlies a top portion of recess 212 and side surface 211. This configuration of flap 220 and finger 122 limits the mobility of electrode 120 (FIG. 1). In particular, flap 220 and portion 222 of finger 122 limit the over-travel of finger 122 along z-axis 12, which also limits the over-travel of electrode 120 along the same axis because finger 122 is preferably a substantially rigid extension from body 121 (FIG. 1).

Finger 122 has a smaller width compared to body 121 and is, therefore, more flexible than body 121. Therefore, the distal end of finger 122 may bend or twist to overlie one of electrodes 160 or 170. The use of flap 220 at the end of finger 122 restricts the motion of finger 122 and prevents the significant bending or twisting of finger 122. The use of flap 220 also eliminates the need for an expensive plate or cap that overlies electrode 120 to restrict its z-axis mobility. If portion 222 of finger 122 has a dimple or a bump in the negative z-axis direction as known in the art, then portion 222 and flap 220 can limit the motion of finger 122 along both directions of z-axis 12.

The many motion stops or over-travel limiters described above also serve a second purpose, which is to prevent or at least reduce the problem of stiction during the manufacturing of sensor 100 and also during the use of sensor 100. The stiction problem during the manufacturing of sensor 100 is explained in more detail hereinafter.

During use, a stiction or latching phenomenon may cause finger 122 to adhere or stick to one of stationary electrodes 160 or 170. However, the use of structure 200, portion 222 of finger 122, and protrusions 131, 141, 151, 260, and 270 prevent the surface of finger 122 from contacting the surfaces of either stationary electrodes 160 or 170. This separation of surfaces prevents or at least reduces the likelihood of latching during operation of sensor 100.

To improve the effectiveness of the latch-prevention, structure 200 is preferably not electrically shorted to either of stationary electrodes 160 or 170. Structure 200 can remain electrically floating or electrically biased to the same potential as finger 122 and electrode 120. To further improve the effectiveness of latch-prevention, the surface area of portion 222 of finger 122 that contacts the walls of recess 212 and the surface areas of protrusions 131, 141, 151, 260, and 270 that contact adjacent features are all preferably be kept to a minimum. When considering only the stiction problem, the preferred shape for protrusions 131, 141, 151, 260, and 270 is a spike that has a sharp point. However, when also considering manufacturing limitations and reliability concerns, a round bump is the preferred embodiment for the protrusions.

Different embodiments can be implemented to provide the over-travel limiting function and the anti-stiction function. For example, returning to FIG. 1, finger 123 of movable electrode 120 has nubs, bumps, spikes, or protrusions 125 extending from surfaces of finger 123 towards adjacent stationary electrodes 160 and 170. However, in the preferred embodiment, the fingers of electrode 120 do not have any protrusions to refrain from impacting the movement of electrode 120. As illustrated by the configuration in FIG. 1, protrusions 125 do not have to have a mirror symmetry along finger 123. Similarly, protrusions 161 and 171 that extend from surfaces of stationary electrodes 160 and 170, respectively, also do not have to be symmetrically located across from each other. However, the symmetric configuration of protrusions 260 and 270 is preferred to facilitate accurate differential capacitance calculations. For similar reasons, the plurality of electrode fingers of electrode 120 are preferably symmetrical to each other; the plurality of stationary electrodes 160 are preferably symmetrical to each other; and the plurality of stationary electrodes 170 are also preferably symmetrical to each other. Therefore, in the preferred embodiment, all of the electrode fingers have the same number and same configuration of protrusions; all of electrodes 160 have the same number and same configuration of protrusions; and all of electrodes 170 have the same number and same configuration of protrusions.

Figure 3:
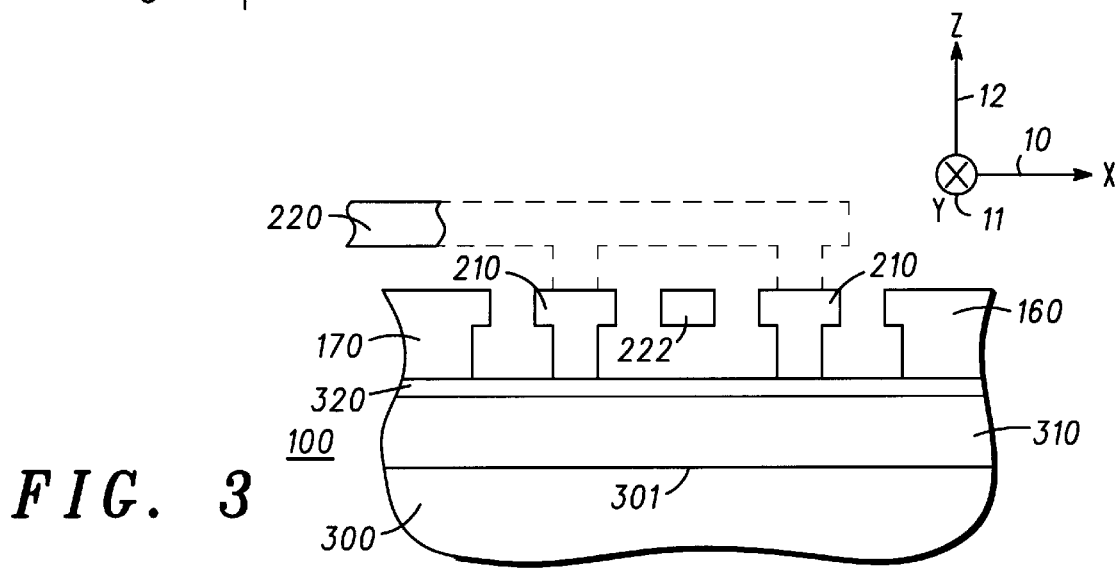
FIG. 3 illustrates a cross-sectional view of the sensor taken along a section line 3—3 in FIG. 2.

FIG. 3 illustrates a cross-sectional view of sensor 100 taken along a section line 3—3 in FIG. 2. Flap 220 is preferably physically coupled or connected to body 210 at both sides of portion 222 of finger 122. This attachment configuration of flap 220 strengthens flap 220 and limits the over-travel of finger 122 along z-axis 12 in a more reliable manner.

FIG. 3 also illustrates a support substrate 300 with a surface 301 underlying finger 122 of electrode 120 (FIG. 1), electrodes 160 and 170, and body 210 and flap 220 of structure 200 (FIG. 2). Dielectric layers 310 and 320 located between surface 301 and electrodes 120, 160, and 170 are explained in more detail hereinafter.

Figure 4:
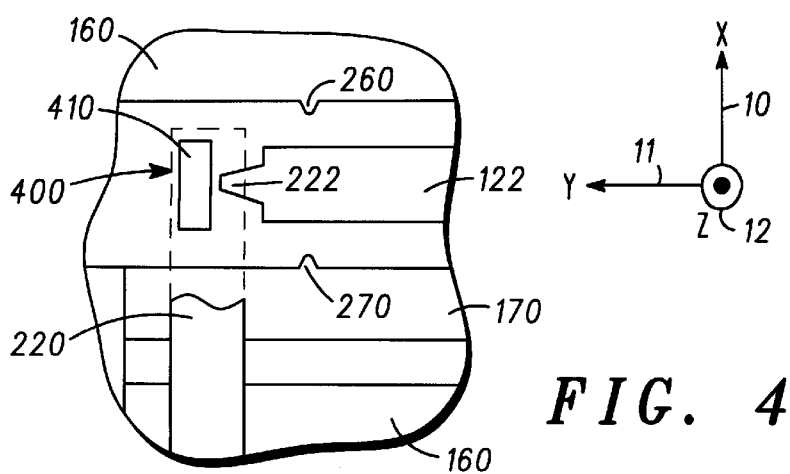
FIG. 4 illustrates a different embodiment of the cut-away top view of the portion of the sensor illustrated in FIG. 2.

FIG. 4 illustrates a different embodiment of the cut-away top view of the portion of sensor 100 illustrated in FIG. 2. A structure 400 includes a body 410 and flap 220. Structure 400 in FIG. 4 replaces structure 200 of FIG. 2 and serves a similar purpose as structure 200. Unlike body 210 of FIG. 2, body 410 in FIG. 4 does not have a recess. Body 410 and portion 222 of finger 122 provide over-travel protection along y-axis 11, but not along x-axis 10.

When using structure 400 in FIG. 4, protrusions 260 and 270 are preferably also used to limit the motion of finger 122 along x-axis 10 and to prevent stiction between finger 122 and stationary electrodes 160 and 170. However, when using structure 200 in FIG. 2, the use of protrusions 260 and 270 is optional. When protrusions 260 and 270 are not used, the gap between portion 222 of finger 122 and the walls of recess 212 in body 210 are preferably smaller than the gap between the main body of finger 122 and electrodes 160 and 170.

Figure 5:
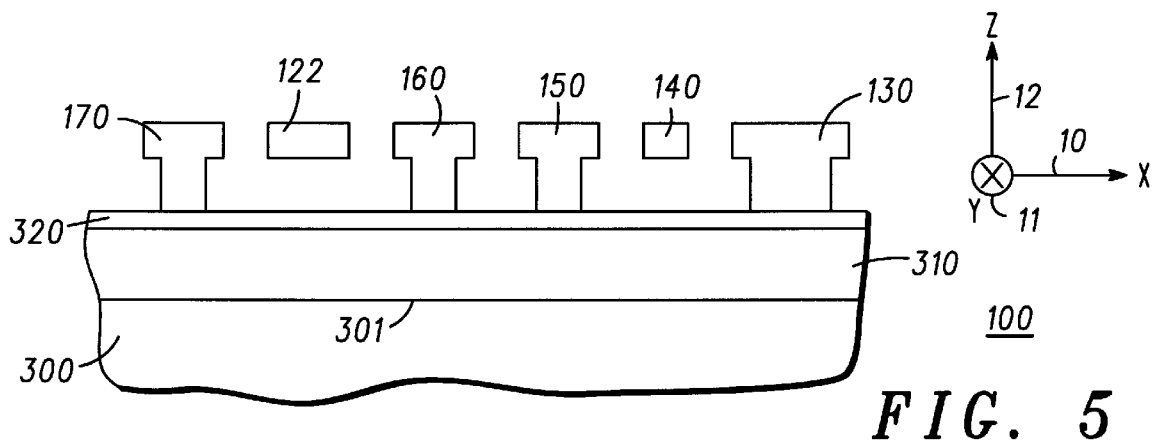
FIG. 5 illustrates a cross-sectional view of the sensor taken along a section line 5—5 in FIG. 1.

FIG. 5 illustrates a cross-sectional view of sensor 100 taken along a section line 5—5 in FIG. 1. Electrodes 160 and 170, anchor 130, and guard structure 150 are illustrated to be stationary or fixed relative to support substrate 300. Beam 140 and finger 122 of electrode 120 are illustrated to be movable relative to substrate 300.

Figure 6:
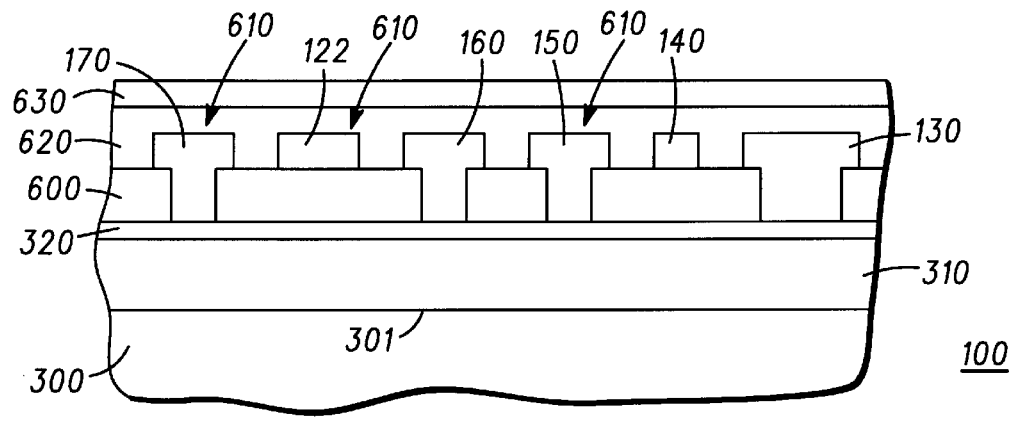
FIG. 6 illustrates the portion of the sensor in FIG. 5 during a previous stage of manufacturing.
Figure 7:
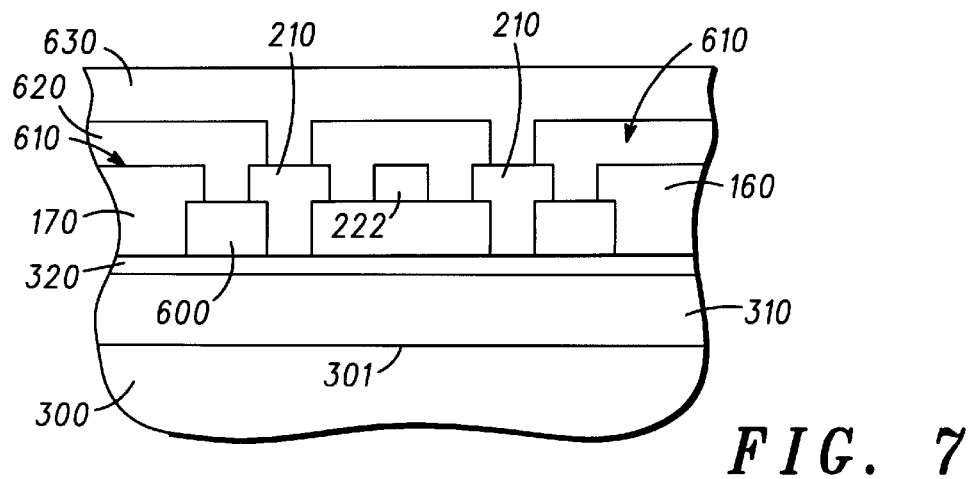
FIG. 7 illustrates the portion of the sensor in FIG. 3 during a previous stage of manufacturing.

FIG. 6 illustrates the portion of sensor 100 in FIG. 5 during a previous stage of manufacturing, and FIG. 7 illustrates the portion of sensor 100 in FIG. 3 during the same previous stage of manufacturing. In fabricating sensor 100, support substrate 300 is provided with a substantially planar surface 301. As an example, substrate 300 can be a semiconductor substrate comprised of silicon, gallium arsenide, or the like.

Dielectric layers 310 and 320 are sequentially deposited over surface 301 to provide electrical isolation between the overlying electrodes and substrate 300. In some embodiments, a single dielectric layer 310 can be used. However, in the preferred embodiment, both layers 310 and 320 are used. Layer 310 is preferably comprised of silicon dioxide, and layer 320 is preferably comprised of silicon nitride. The purpose for layer 320 is to serve as an etch stop during the removal of two subsequently deposited sacrificial layers. To form the aforementioned dimple in finger 122, a recess can be etched into layer 310 before depositing layer 320.

Next, a first sacrificial layer 600 is deposited over layer 320. Layer 600 is subsequently removed and are preferably comprised of a material that can be selectively removed or etched without removing or etching other adjacent layers. In the preferred embodiment, layer 600 is comprised of silicon dioxide. Layer 600 is then patterned to provide openings in layer 600 that expose portions of underlying layer 320.

A layer 610 is deposited over layer 600 and into the openings of patterned layer 600. Layer 610 is then patterned into electrode 120, anchor 130, beam 140, guard structure 150, stationary electrodes 160 and 170, and body 210 of structure 200. For manufacturing simplicity, these features are preferably all simultaneously formed from layer 610 using a single etch step with a single etch mask. Although not illustrated in FIG. 6 or 7, this single etch step is also used to simultaneously form protrusions 131, 141, 151, 260, and 270 (FIGS. 1 and 2). In the preferred embodiment, layer 610 is comprised of a doped polycrystalline silicon (polysilicon) layer and is etched using a plasma etchant comprised of hydrogen bromide (HBr), chlorine ($Cl_2$), helium (He), and oxygen ($O_2$). In an alternative embodiment, layer 610 can be comprised of a metal such as, for example, nickel or permalloy. For the optimum operation of sensor 100, the sidewalls of electrodes 120, 160, and 170 are preferably substantially perpendicular to surface 301 of substrate 300 and preferably substantially parallel to z-axis 12.

Then, a second sacrificial layer 620 is deposited over patterned layer 610 and patterned layer 600. For manufacturing simplicity, layer 620 is preferably comprised of the same material as layer 600 so that layers 600 and 620 can be subsequently removed in the same etch step using the same etchant. As illustrated on FIG. 7, layer 620 is patterned to provide openings in layer 620 that expose portions of underlying layer 610.

Next, as illustrated in both FIGS. 6 and 7, a layer 630 is deposited over layer 620 and into the openings of layer 620. Layer 630 is patterned to form flap 220 of sensor 100, as illustrated in FIG. 3. During the patterning of layer 630, the portion of layer 630 illustrated in FIG. 6 is removed. Layer 630 can also be used as a separate interconnect layer 180 (FIG. 1) and can be patterned to electrically couple together each of stationary electrodes 170, as illustrated in FIG. 1. Layer 630 is preferably comprised of doped polycrystalline silicon, similar to that of layer 610. Layer 630, and thus flap 220, is preferably substantially planar to the top surface of finger 122 and to surface 301 of substrate 300 in order to optimize the reliability of the over-travel limiting function of flap 220.

Finally, sacrificial layers 620 and 600 are removed to release beam 140 and fingers 122 and body 121 of electrode 120. An embodiment of sensor 100 after this release step is illustrated in FIGS. 1, 3, and 5. As discussed earlier, the etchant used to remove layers 600 and 620 preferably does not significantly etch dielectric layer 320 or layers 610 or 630 for proper fabrication of sensor 100. When layers 600 and 620 are comprised of silicon dioxide, when layer 320 is comprised of silicon nitride, and when layers 610 and 630 are comprised of polycrystalline or monocrystalline silicon, a wet etchant comprised of hydrofluoric, acetic acid, and anhydride is preferably used to remove layers 600 and 620.

As illustrated in FIG. 1, the spacing between fingers 122 and 123 and stationary electrodes 160 and 170 is preferably sufficient to permit adequate flow of the etchant to remove all of layers 600 and 620. To facilitate the etchant flow, body 121 can have perforations or through-holes 126. For similar reasons, protrusions 131, 141, 151, 260, and 270 are preferably not too large to substantially obstruct the flow of the etchant. Likewise, as illustrated in FIG. 2, portion 222 of finger 122 is preferably not be too large, and flap 220 preferably does not overlap too much of finger 122. As illustrated in FIG. 2, flap 220 preferably overlaps only the narrow end or portion 222 of finger 122 and does not overlap the wider main body of finger 122.

After the removal of the sacrificial layers, electrode 120 is released and becomes movable relative to substrate 300. After the wet etching step, sensor 100 is dried off. However, during this drying step, stiction often occurs where capillary forces immobilize electrode 120 by adhering electrode 120 to electrodes 160 or 170 or some other adjacent structure.

However, in sensor 100, the aforementioned small contact surface areas of structure 200 (FIG. 2), portion 222 of finger 122 (FIG. 2), and protrusions 131, 141, 151, 260, and 270 reduce the occurrence of this stiction problem.

After the removal of the sacrificial layers, electrode 120 remains overlying surface 301 of substrate 300, as illustrated in FIGS. 1, 2, 3, and 5. As discussed earlier, electrode 120 is movable along x-axis 10 to detect acceleration along x-axis 10, which is substantially parallel to surface 301 of substrate 300. Anchor 130, guard structure 150, and electrodes 160 and 170 remain overlying surface 301 and also remain coupled to surface 301 through dielectric layers 310 and 320 and thereby remain fixed or stationary relative to substrate 300 after the removal of the sacrificial layers.

Therefore, a micromachined sensor with improved over-travel limiters is provided to overcome the disadvantages of the prior art. The sensor described herein has improved manufacturing yields and also has improved reliability because of the three dimensional over-travel limiters that also alleviate the stiction problem. The sensor is less susceptible to stiction during the drying process after the movable electrode is released and during operation of the sensor. The alleviation of the stiction problem also permits the use of longer fingers and a higher number of fingers to increase the amount of capacitive area and to increase the sensitivity of the sensor.

With the use of over-travel limiters, the sensor is also able to withstand high impact forces in a direction along the sensor's axis of sensitivity and in other directions not along the sensor's axis of sensitivity. Additionally, the beams used to support the movable electrode above the support substrate can have a lower spring constant to provide greater sensitivity to smaller acceleration forces and expands the number of different applications for which the sensor is suitable.

While the invention has been particularly shown and described mainly with reference to preferred embodiments, it will be understood by those skilled in the art that changes in form and detail may be made without departing from the spirit and scope of the invention. For instance, the numerous details set forth herein such as, for example, the material and etchant compositions and the specific configurations or shapes are provided to facilitate the understanding of the present invention and are not provided to limit the scope of the invention. As another example, the three dimensional over-travel limiter concept can be applied to both in-plane and out-of-plane accelerometers including, but not limited to, yaw rate sensors, gear devices, inertial sensors, and resonators. Furthermore, flap 220 in FIG. 1 can be separated into discrete parts that do not overlie stationary electrodes 160 or 170.

Moreover, in FIG. 4, finger 122 could be devoid of portion 222, and body 410 could have a protrusion that serves the same function as portion 222. In this embodiment, flap 220 would overlie the full width of finger 122. However, this alternative embodiment is not as desirable compared to the embodiment of FIG. 4 because the flow of etchant to remove the sacrificial layers is more restricted in this alternative embodiment compared to the embodiment of FIG. 4.

Accordingly, the disclosure of the present invention is not intended to be limiting. Instead, the disclosure of the present invention is intended to be illustrative of the scope of the invention, which is set forth in the following claims.

What is claimed is:

1. A sensor comprising:

a semiconductor substrate with a surface;

a doped silicon anchor overlying and coupled to the surface of the semiconductor substrate and having protrusions;

a doped silicon beam coupled to the doped silicon anchor and having protrusions;

first and second doped silicon electrodes overlying and coupled to the surface of the semiconductor substrate, each of the first and second doped silicon electrodes having a surface substantially perpendicular to the surface of the semiconductor substrate, the surfaces facing towards each other, and each of the surfaces having protrusions extending toward the other surface, the first and second doped silicon electrodes being stationary relative to the semiconductor substrate;

a doped silicon structure overlying and coupled to the surface of the semiconductor substrate and located between the first and second doped silicon electrodes, the doped silicon structure being stationary relative to the semiconductor substrate, the doped silicon structure having a side surface with a recess and having a flap covering a top portion of the recess; and a third doped silicon electrode coupled to the doped silicon beam, overlying the surface of the semiconductor substrate, and movable relative to the semiconductor substrate, the doped silicon structure, and the first and second doped silicon electrodes in response to an acceleration force, the third doped silicon electrode having a finger extending from a body, the finger located between the first and second doped silicon electrodes and located between the protrusions of the first and second doped silicon electrodes, wherein a distal end of the finger is located in the recess of the doped silicon structure and under the flap of the doped silicon structure, and wherein the protrusions of the doped silicon anchor, the protrusions of the doped silicon beam, the protrusions of the first and second doped silicon electrodes, the doped silicon structure, and the finger limit movement of the third doped silicon electrode along three axes substantially perpendicular to each other wherein first and second ones of the three axes are substantially parallel to the surface of the semiconductor substrate and wherein a third one of the three axes is substantially perpendicular to the surface of the semiconductor substrate.

* * * * *